Patented Sept. 15, 1953

2,652,337

UNITED STATES PATENT OFFICE 2,652,337

FUMIGANT COMPOSITIONS CONTAINING COMPLETELY HALOGENATED BROMO-CHLOROMETHANES HAVING AT LEAST TWO CHLORINE ATOMS

John A. Pianfetti, South Charleston, W. Va., Roy Melvin, Dobbs Ferry, N. Y., and Hilton H. Earle, Jr., Belle Glade, Fla., assignors to Food Machinery and Chemical Corporation, New York, N. Y., a corporation of Delaware No Drawing. Application January 19, 1950, Serial No. 139,526

8 Claims. (Cl. 99—225)

This invention relates to new and improved fumigant compositions for fumigating insect-infested grain and especially to fumigant compositions containing a mixture of completely halogenated bromochloromethanes having at least two chlorine atoms with chlorinated hydrocarbons.

Such compositions have the advantage of ease of applicability to grain bins and grain piles, complete penetration through the grain, and a high killing effect with the use of a minimum amount of the fumigant composition.

The provision of a satisfactory fumigant for the fumigation of grain requires a number of well-balanced properties. The fumigant should not leave a residual odor or taste or interfere with the subsequent milling or utilization of the grain. If the fumigant is toxic to human beings, it is important that none of the substances be permanently adsorbed or absorbed by the grains. It is likewise important that the fumigant be noninflammable and permit transportation and storage in ordinary containers and be easily applied to the grain. In the application of the fumigant, it should permeate to all sections of the area or substances being fumigated in order that the desired effects may be produced.

It is an object of this invention to provide an improved fumigant composition of especially high potency which will have all of the above, as well as other valuable properties.

The fumigant composition of our invention is stable in storage, is noninflammable, and may be easily and effectively applied in use.

A further object of our invention is to provide a fumigant for grains which diffuses and permeates throughout grain masses and effectively kills all stages of insects and other pests therein, and yet leaves no residual deleterious odors or tastes.

Another object of our invention is to provide a fumigant which may be applied in effective quantities without adversely affecting the germinating properties of grains or seeds treated therewith.

In accordance with our invention, especially potent fumigant compositions are provided which comprise completely halogenated bromochloromethane containing at least two chlorine atoms and chlorinated hydrocarbons. We have found that when bromotrichloromethane is incorporated in carbon tetrachloride in an amount equaling 10 per cent by volume thereof and applied in quantities of 0.5 gallon per 1,000 bushels of wheat, a fumigant is provided which is 100 per cent effective in killing a wide variety of insects, including adult $Tribolium\ confusum$ Duv., i. e. confused flour beetles, or $Sitopholus\ oryza$ (L), i. e. rice weevil. The effectiveness of this fumigant may be contrasted with the effectiveness of a typical fumigant such as a mixture containing 3 parts of ethylene dichloride to 1 part of carbon tetrachloride, by volume, which is normally considered 100 per cent effective in killing such adult insects only in quantities of at least 3 gallons per 100 bushels of grain. The aforesaid composition is also 100 per cent effective in killing said pests when used in a quantity equaling about 3 pounds per 1,000 cubic feet of an enclosed area. The effectiveness of the compositions of this invention becomes more readily apparent when it is noted that under identical conditions, 0.5 gallon of carbon tetrachloride killed only 11 per cent of the confused flour beetles and like quantities of ethylene dibromide or ethylene dichloride failed to kill any of the beetles.

Pesticidal compositions of this invention have shown unusual potency and exceptional penetrating power in the killing of immature forms of the rice weevil. Due to the rice weevil's known tendency of sealing the hole in which it deposits its eggs in the grain with a gelatinous secretion, conventional fumigants in recommended dosages normally have the capacity neither to destroy all eggs nor to kill all larvae. For example, in a series of tests a standard mix of 3 parts of ethylene dichloride and 1 part of carbon tetrachloride, by volume, was substantially ineffective in killing the immature forms of the rice weevil when applied to wheat in a quantity of 1 gallon per 1,000 bushels in view of the fact that 520 adults emerged forty-two days after the treatment, while only 527 emerged when the grain was untreated. When the same quantity of a fumigant composition composed of 10 per cent of bromotrichloromethane in carbon tetrachloride was applied, all such immature forms were killed, as indicated by the fact that there was no emergence of adult forms after forty-two days.

The compositions of this invention have the advantage of greatly facilitating the uniform dispersion of the pesticide throughout the mass being treated. This advantage is readily understood by comparing the potency and the killing power of carbon tetrachloride, carbon tetrachloride containing a minor portion of bromotrichloromethane, and an equimolecular mixture of carbon tetrachloride and ethylene dibromide when applied to the top of the grain being fumigated as shown in the following table:

TABLE 1

Fumigation tests on S. oryza (TEST ORGANISMS PLACED AT VARIOUS DEPTHS)

| Treatment | Gal. 1,000 Bu. | Days | Check | Percent Control Immature Forms, Depth in Inches | | | |
|---|---|---|---|---|---|---|---|
| | | | | 19 | 13 | 6 | 0 |
| Carbon tetrachloride | 3 | 42 | 918 | 91 | 82 | 90 | 73 |
| Bromotrichloromethane in carbon tetrachloride, 200 g./l | 1 | 42 | 1,540 | 94 | 93 | 94 | 93 |
| Equimolecular mixture of ethylene dibromide and carbon tetrachloride | 1 | 41 | 891 | 0 | 36 | 100 | 100 |

In carrying out the tests, the results of which are set forth above, permeable bags containing 200 cubic centimeters of grain infested by S. oryza were placed at various depths in the grain as indicated, and the fumigants were applied to the top of the grain, after which the grain container was kept closed for two days. At this time the bags having the infested grain therein were removed and the infested grain in each bag sifted to remove all dead and live adults therefrom. The sifted (infested) grain was then placed in screen covered jars which were set aside for forty days or more. At the end of this time the grain in each jar was again sifted and the number of adults emerged recorded. The per cent control is determined by comparing the number of adults emerged from the treated sample with the number emerged from an untreated check sample.

The foregoing demonstration of the fact that the compositions of this invention have the advantage of being uniformly distributed throughout the mass of grain, as shown by uniform killing of the pests at the various levels in the grain mass, is especially important in the treatment of immature forms of S. oryza where the fumigant must be in contact with the grain particles sufficiently long to permit permeation into the interior of the grain where the egg of the weevil is deposited.

The relative potency of the compositions containing the completely halogenated bromochloromethanes containing at least two chlorine atoms is readily observed by a comparison of the effectiveness of other related completely and incompletely halogenated methanes shown hereinbelow. The tests were conducted over a limited period of treatment, and as a result the optimum killing power has not been demonstrated, yet the relative efficiencies of the compositions are disclosed.

TABLE 2

Relative toxicity of halogenated methane compositions to immature forms of S. oryza

| Treatment | Percent Control at Gals./1,000 Bushels Wheat Indicated | | | |
|---|---|---|---|---|
| | 3 | 2 | 1 | 0.5 |
| Carbon tetrachloride | 99 | 98 | 75 | 0 |
| Bromotrichloromethane in Carbon tetrachloride, 100 g./l | 100 | 99 | 93 | 57 |
| Dibromodichloromethane in Carbon tetrachloride, 100 g./l | 99 | 98 | 76 | 51 |
| Bromodichloromethane in Carbon tetrachloride, 100 g./l | 99 | 98 | 61 | 12 |
| Tribromochloromethane in Carbon tetrachloride, 100 g./l | 97 | 95 | 62 | 0 |

Per cent control of immature forms of S. oryza, as measured by the number of adults emerging forty-two days after the fumigation, was determined as described in connection with the foregoing table.

The fumigant solutions listed in Table 2 are prepared by placing 100 grams of a bromochloromethane in a container and adding carbon tetrachloride until the solution measures a total of one liter. It will be understood that lesser quantities of the solution can be prepared such, for instance, as 100 cubic centimeters prepared by adding carbon tetrachloride to 10 grams of bromochloromethane until the desired volume of 100 cubic centimeters is obtained.

The following Table 3 shows the relative effectiveness of various concentrations of bromotrichloromethane in controlling immature forms of rice weevil, S. oryza. The tests were conducted at 26° C. and 1,777 adults emerged from the control or untreated sample.

TABLE 3

Effectiveness of various strengths of bromotrichloromethane

| Treatment | Percent Control at Gals./1,000 Bushels Wheat Indicated | | |
|---|---|---|---|
| | 3 | 2 | 1 |
| Bromotrichloromethane in Carbon tetrachloride, 200 g./l | 99 | 99 | 99 |
| Bromotrichloromethane in Carbon tetrachloride, 100 g./l | 100 | 99 | 98 |
| Bromotrichloromethane in Carbon tetrachloride, 50 g./l | 99 | 98 | 89 |
| Bromotrichloromethane in Carbon tetrachloride, 20 g./l | 98 | 95 | 76 |
| Carbon tetrachloride | 95 | 82 | 71 |

In the table the concentrations on a weight/weight basis vary from about 1.2% to about 12%.

The completely halogenated bromochloromethanes of this invention may be used with numerous other compatible noninflammable chlorinated organic solvents of an aliphatic or aromatic nature. Those having a flash point above 80° F. and a boiling point up to 150° C., such as ethylene dichloride, methylene chloride, and the like are preferred. In order to be fully effective, especially in killing the immature forms of the rice weevil, the bromochloromethanes must be present in a substantial but normally minor quantity. Compositions having adequate toxicities have been provided by using from 2 to 25 parts by weight of the bromochloromethane to 98 to 75 parts by weight of the halogenated hydrocarbon.

In bins filled with grain, the pesticidal compositions herein described may be applied to the surface of the grain, or the compositions may be introduced into the top of grain piles, elevators, granaries, vaults, or other containers, or in large elevators the composition may be added continuously or intermittently with the grain flow. In either instance, the vapor pressure of the pesticidal compositions is such that a complete and thorough penetration is obtained.

While the compositions of this invention have proven very effective pesticides, it will be understood that other compatible ingredients such as carriers, extenders, or other toxicants such as ethylene dibromide may be incorporated in our compositions. It will be understood that the specific embodiments of our invention are not to be considered as limitations thereupon.

We claim:

1. A volatile fumigant composition containing by weight between 75% and 98% of a liquid chlorinated hydrocarbon of not more than two carbon atoms, having a boiling point below 150° C., and between 2% and 25% of a completely halogenated bromochloromethane selected from the group consisting of bromotrichloromethane and dibromodichloromethane.

2. A volatile fumigant composition comprising by weight between 75% and 98% of carbon tetrachloride and from 2% to 25% of bromotrichloromethane.

3. A volatile fumigant composition comprising by weight between 75% and 98% of carbon tetrachloride and from 2% to 25% of dibromodichloromethane.

4. A fumigant composition containing by weight between 75% and 98% of carbon tetrachloride and between 2% and 25% of a bromochloromethane of the group consisting of bromotrichloromethane and dibromodichloromethane.

5. The method of fumigating pest-ridden material which comprises contacting said material with toxic quantities of a composition comprising by weight between 75% and 98% of a liquid chlorinated hydrocarbon other than bromochloromethane, having a flash point above 80° F. and a boiling point below 150° C. and between 2% and 25% of a bromochloromethane of the group consisting of bromotrichloromethane and dibromodichloromethane, and maintaining said contact for a time sufficient to render said material substantially completely pest-free.

6. The method of fumigating insect-infested grain which comprises contacting said grain with a toxic quantity of a volatile liquid fumigant, comprising 2% to 25% by weight of a bromochloromethane selected from the group consisting of bromotrichloromethane and dibromodichloromethane, and 75% to 98% by weight of a liquid chlorinated hydrocarbon having a flash point above 80° F. and a boiling point below about 150° C.

7. The method of fumigating insect-infested grain which comprises contacting said grain with a toxic quantity of a volatile liquid fumigant, comprising 2% to 25% by weight of a bromochloromethane selected from the group consisting of bromotrichloromethane and dibromodichloromethane, and 75% to 98% by weight of carbon tetrachloride.

8. The method of fumigating pest-ridden material which comprises contacting said material with a toxic quantity of the composition set forth in claim 4, and maintaining said contact for a time sufficient to render said material substantially completely pest-free.

JOHN A. PIANFETTI.
ROY MELVIN.
HILTON H. EARLE, Jr.

References Cited in the file of this patent

UNITED STATES PATENTS

| Number | Name | Date |
|---|---|---|
| 2,391,890 | Fletcher et al. | Jan. 1, 1946 |

OTHER REFERENCES

Roark et al.: U. S. D. A. Technical Bulletin, Number 162, entitled "Tests of Various Aliphatic Compounds as Fumigants," March 1929, pages 1 to 3 and 6 to 11.

Lecomte et al.: Compt. rend., volume 204, pages 1927 to 1929 (1937).